United States Patent [19]

Hagiwara

[11] Patent Number: 4,970,405
[45] Date of Patent: Nov. 13, 1990

[54] CLOCK SELECTION CIRCUIT FOR SELECTING ONE OF A PLURALITY OF CLOCK PULSE SIGNALS

[75] Inventor: Misao Hagiwara, Tokyo, Japan

[73] Assignee: NEC Corporation, Tokyo, Japan

[21] Appl. No.: 283,143

[22] Filed: Dec. 12, 1988

[30] Foreign Application Priority Data

Dec. 11, 1987 [JP]  Japan ................... 62-313583

[51] Int. Cl.⁵ ............... H03K 5/13; H03K 19/02; H03K 7/00; H03K 17/00
[52] U.S. Cl. ............... 307/269; 307/480; 328/63; 328/72
[58] Field of Search ............... 307/269, 480; 328/55, 328/63, 72

[56] References Cited

U.S. PATENT DOCUMENTS 4,713,621  12/1987  Nakamura et al. ............ 328/63
4,796,095  1/1989   Shimada ..................... 328/63

FOREIGN PATENT DOCUMENTS 0165498  12/1985  European Pat. Off. ........... 307/269

Primary Examiner—Stanley D. Miller
Assistant Examiner—Trong Phan
Attorney, Agent, or Firm—Foley & Lardner, Schwartz, Jeffery, Schwaab, Mack, Blumenthal & Evans

[57] ABSTRACT

A clock selection circuit for selecting and outputting one of several clock pulse signals supplied thereto includes a selector supplied with the clock pulse signals and with selection signals each corresponding to the clock pulse signals and selecting one of the clock pulse signals when a corresponding selection signal takes a selection level. A control circuit is supplied with selection data for producing the selection signals, one of which takes the selection level in response to the selection data. The control circuit responds to the change of the selection data for changing one of the selection signals from the selection level to the non-selection level without a substantial delay and another selection signal from the non-selection level to the selection level after a delay of at least one clock pulse of the clock pulse signal to be selected.

7 Claims, 4 Drawing Sheets

CLOCK SELECTION CIRCUIT FOR SELECTING ONE OF A PLURALITY OF CLOCK PULSE SIGNALS

BACKGROUND OF THE INVENTION

The present invention relates to a clock selection circuit which, in response to selection data, selects and outputs one of a plurality of clock pulse signals having frequencies and/or phases different from each other.

Synchronous control systems such as microcomputers, disk controllers, etc. are required to switch a system clock pulse signal from one frequency and/or phase to another frequency and/or phase. For this purpose, a clock selection circuit is employed, which receives a plurality of clock pulse signals having frequencies and/or phases different from each other and selects and outputs one of them in response to selection data to switch the system clock pulse signal to the required frequency and/or phase.

However, the clock selection circuit according to prior art immediately switches the clock pulse signal to be selected in response to the change of the selection data. Since the clock pulse signals are asynchrous with each other, the leading edge or falling edge of the selected clock pulse signal happens to appear just after the change of the selection data. As a result, an unexpected excessive pulse of a very narrow pulse width is outputted as a system clock pulse. In other words, the system clock pulse signal temporarily takes a cycle period that is shorter than the cycle period of the clock pulse having the highest frequency. The systems are thereby brought into an erroneous operation.

SUMMARY OF THE INVENTION

Therefore, an object of the present invention is to provide an improved clock selection circuit to release a system from an erroneous operation.

Another object of the present invention is to provide a clock selection circuit for selecting and outputting one of a plurality of clock pulse signals without outputting any excessive pulse having a very short pulse width.

Still another object of the present invention is to provide a system clock generator generating a system clock pulse signal which has a variable frequency and/or phase and is free from taking a cycle period that is shorter than a predetermined cycle period.

A clock selection circuit according to the present invention comprises a selector supplied with a plurality of clock pulse signals and a plurality of selection signals, each of which corresponds to each of the clock pulse signals and one of which takes a selection level, for selecting one of the clock pulse signals which corresponds to that selection signal taking the selection level, a control circuit supplied with selection data for producing a plurality of control signals, each of which corresponds to each of the selection signals and one of which takes an active level, and means coupled between the control circuit and the selector for delaying the active level in synchronism with the clock pulse signal to be selected and for changing the corresponding one of the selection signals to the selection level by use of the delayed active level.

Thus, the clock pulse signal to be selected is not switched after the change of the selection data, but switched after delaying one or more clock pulses of the clock pulse signal to be selected. An undesired narrow pulse is thereby no produced.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
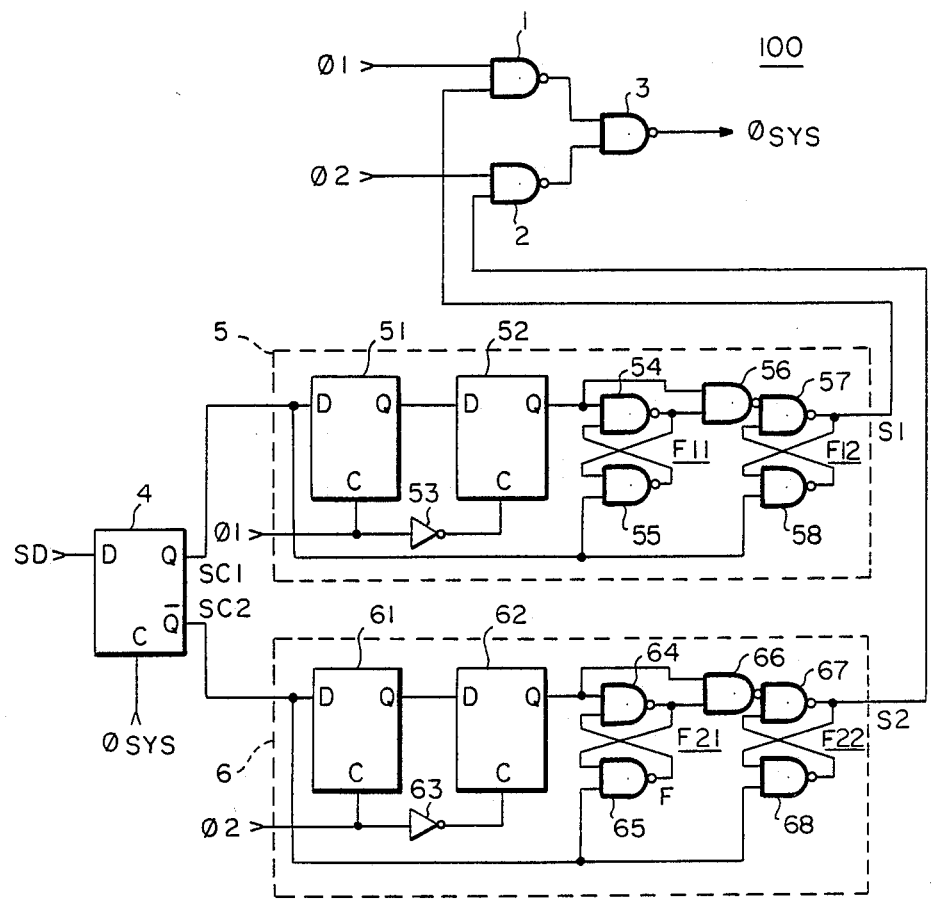
FIG. 1 is a circuit diagram representative of a clock selection circuit according to an embodiment of the present invention.

Referring to FIG. 1, a clock selection circuit 100 according to an embodiment of the present invention receives two clock pulse signals $\phi 1$ and $\phi 2$ and selects and outputs one of them as a system clock pulse signal $\phi_{SYS}$ in response to selection data SD. Since two clock pulse signals $\phi 1$ and $\phi 2$ are switched, the selection data SD consists of one bit as shown. The clock pulse signals $\phi 1$ and $\phi 2$ are supplied respectively to the first input nodes of NAND gates 1 and 2, the second nodes of which are supplied respectively with first and second selection signals S1 and S2. The output nodes of the NAND gates 1 and 2 are connected to the input nodes of a NAND gate 3, from which the system clock pulse signal $\phi_{SYS}$ is derived. One of the selection signals S1 and S2 takes a select level (a high level in this embodiment) and the other of them takes a non-selection level (i.e., a low level). When the first selection signal takes the selection level, the NAND gate 1 is in an open state and the NAND gate 2 is in a closed state. The first clock pulse signal $\phi 1$ is thereby selected and outputted as the system clock $\phi_{SYS}$ via the NAND gates 1 and 3. On the other hand, the selection level of the second selection signal S2 makes the NAND gate 2 open, so that the second clock signal $\phi 2$ is selected and outputted as the system clock $\phi_{SYS}$. Thus, the NAND gates 1 to 3 constitute a selector for selecting one of the clock signals $\phi 1$ and $\phi 2$ in response to the selection signals S1 and S2.

The selection data signal SD is supplied to the data input terminal D of a D-type flip-flop (called hereinafter a "D-FF") 4 whose control terminal C is supplied with the inverted signal of the system clock pulse signal $\phi_{SYS}$, i.e. $\overline{\phi}_{SYS}$. The D-FF 4 latches the selection data signal SD in synchronism with the leading edge of the signal $\overline{\phi}_{SYS}$, i.e. the falling edge of the system clock pulse signal $\phi_{SYS}$. The true data and complementary data of the latched selection data signal SD are outputted from the true output terminal Q and the complementary output terminal $\overline{Q}$ as first and second selection control signals SC1 and SC2, respectively. When the high level selection data SD is latched in the D-FF 4, therefore, the first control signal SC1 takes an active level (the high level) and the second control signal SC2 takes an inactive level (the low level). On the other hand, in case where the D-FF 4 latches the low level selection data SD, the second control signal SD2 takes the active level, the first control signal SD1 being at the inactive level.

The first and second control signals SC1 and SC2 thus outputted are transferred respectively to the second input nodes of the NAND gates 1 and 2 a the first and second selection signals S1 and S2 through clock synchronous circuits 5 and 6 which are provided in accordance with the present invention. Each of the clock synchronous circuits 5 and 6 are of the same circuit construction and thus includes two D-FFs 51 and 52 (61 and 62), one inverter 53 (63) and five NAND gates 54 to 58 (64 to 68), which are connected as shown. Since the D-FF 51 receives the first clock pulse signal $\phi 1$ at the clock terminal C thereof, it latches the first control signal SC1 in synchronism with the leading edge of the clock $\phi 1$. On the other hand, the D-FF 52 receives the clock $\phi 1$ via the inverter 53, it latches the output of the D-FF 51 in synchronism with the falling edge of the clock $\phi 1$. Similarly, the second control signal $\phi 2$ is latched in the D-FF 61 in synchronism with the leading edge of the second clock $\phi 2$ and the output of the D-F 61 is latched in the D-FF 62 in synchronism with the falling edge of the second clock $\phi 2$. The NAND gates 54 and 55, 57 and 58, 64 and 65, and 67 and 68 are cross-coupled to form flip-flops F11, F12, F21, and F22, respectively.

An operation of the clock selection circuit 100 will described below with reference to FIG. 2.

Assuming that the selection data SD is currently at the high level and hence the clock selection circuit 100 selects and outputs the first clock signal $\phi 1$ as the system clock pulse signal $\phi_{SYS}$, the first control and selection signals SC1 and S1 are at the high level, whereas the second control and selection signals SC2 and S2 are at the low level. Each of the D-FFs 51 and 52 holds the high level output, and each of the D-FFs 61 and 62 holds the low level. Moreover, the outputs of the flip-flops F11, F12 and F21 and the NAND gate 66 are at the high level, whereas the outputs of the NAND gate 56 and the flip-flop F22 are at the low level.

At a time point $T_1$, the selection data SD is changed to the low level in order to switch the clock pulse signal from the first clock $\phi 1$ to the second clock $\phi 2$. Since the D-FF 4 latches the selection data SD in synchronism with the falling edge of the system clock $\phi_{SYS}$, the first and second control signals SC1 and SC2 are changed to the low level and the high level, respectively, at a time point $T_2$. In response to the change of the first control signal SC1 to the low level, the NAND gate 55 changes the output thereof to the high level. At this time $T_2$, the D-FF 52 holds the high level output, so that the output of the flip-flop F11 is inverted to the low level. The output of the NAND gate 56 is thereby changed to the high level. The low level of the first control signal SC1 is further supplied to the NAND gate 58 to change the output thereof to the high level. Thus, the output of the flip-flop F12, i.e. the first selection signal S1, is inverted to the low level at the time point $T_2$. The NAND gate 1 thereby takes the closed state. In response to the leading edge of the first clock $\phi 1$ at a time point $T_4$, the D-FF 51 latches the low level of the first control signal SC1, and in response to the falling edge of the first clock $\phi 1$ at a time point $T_6$, the D-FF 52 latches the low level output of the D-FF 51. Although the output of the NAND gate 54 is inverted to the high level, since the output of the D-FF 52 is at the low level, the NAND gate 56 holds the high level. The first selection signal S1 is thereby held at the low level.

On the other hand, the change of the second control signal SC2 to the low level at the time point $T_2$ is supplied to the NAND gate 65. The NAND gates thereby inverts the output thereof to the low level, but the flip-flop F21 does not change the output level thereof. At this time, since the D-FF 62 holds the low level output, the output of the NAND gate 66 is held at the high level, so that the second selection signal S2 is also held at the low level. In response to the leading edge of the second clock $\phi 2$ at a time point $T_3$, the D-FF 61 latches the high level of the second control signal S2, and the D-FF 62 latches the high level output of the D-FF 61 in synchronism with the falling edge of the second clock $\phi 2$ at a time point $T_5$. By the high level output of the D-FF 62, the output of the NAND gate 66 is inverted to the low level, so that the output of the flip-flop F22, i.e. the second selection signal S2, is inverted to the high level at the time point $T_5$. The NAND gate 2 is thus brought into the open state to allow the second clock pulse signal $\phi 2$ to be outputted as the system clock signal $\phi_{SYS}$. At this time, however, the second clock signal $\phi$ is at the low level, the system clock signal $\phi_{SYS}$ takes the low level, as shown in FIG. 2. Since the control and selection signals SC2 and S2 are at the high level, the NAND gate 68 changes the output level to the low level.

Figure 2:
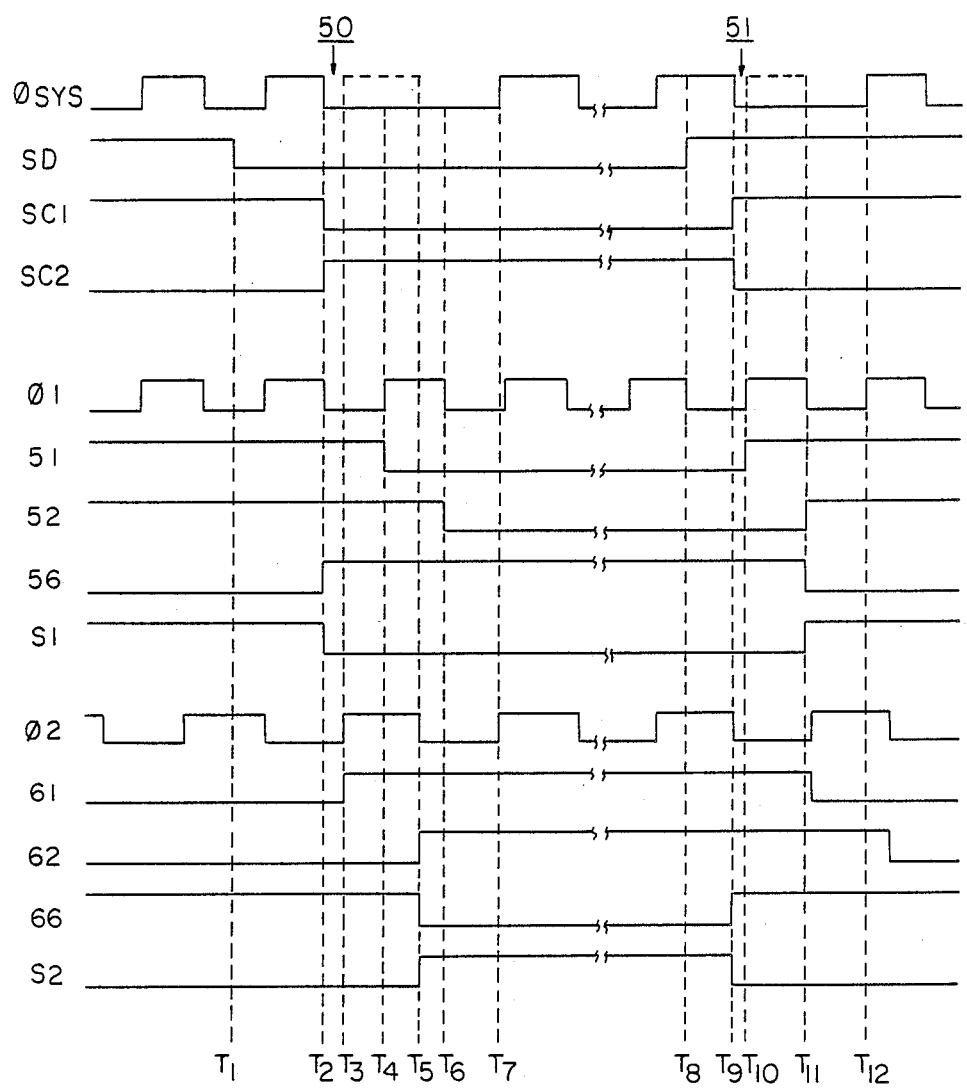
FIG. 2 is a timing chart representative of an operation of the circuit shown in FIG. 1.

If the second clock synchronous circuit 6 was absent to transfer the second control signal SC2 directly to the NAND gate 2 as the second selection signal S2, the NAND gate 2 would take the open state at the time point $T_2$, so that the system clock signal $\phi_{SYS}$ would change to the high at the time point $T_3$, as shown by a dotted line in FIG. 2. In other words, a very narrow low level pulse 50 would be produced as the system clock. The system (not shown in the drawing) is thereby subjected to the error operation.

At a time point $T_8$, the selection data SD is changed to the high level to select again the first clock pulse signal $\phi 1$. The first and second control signals SC1 and SC2 are changed to the high level and the low level, respectively, in synchronism with the falling edges of the system clock $\phi_{SYS}$ at a time point $T_9$. The second selection signal S2 is thereby changed to the low level the same time point $T_9$ to close the NAND gate 2. On the other hand, the first selection signal S1 is changed to the high level in synchronism with the falling edge of the first clock $\phi 1$ appearing at a time point $T_{11}$ that is later than the time point $T_9$. The NAND gate 1 is thereby takes the open state. At this time, however, the first clock signal $\phi 1$ is at the low level, and therefore the system clock signal $\phi_{SYS}$ is in the low level. The system clock signal $\phi_{SYS}$ is changed to the high level in synchronism with the leading edge of the first clock $\phi 1$ at a time point. If the first clock synchronous circuit 5 was absent, the first NAND gate 1 would be brought into the open state at the time point $T_9$, so that a narrow low level pulse 51 would be produced as the system clock $\phi_{SYS}$, as shown in FIG. 2.

Thus, each of the clock synchronous circuits 5 and 6 changes the corresponding selection signal S from the selection level to the non-selection level without a substantial delay when the corresponding control signal SC is varied from the active level to the inactive level and changes the corresponding selection signal S from the non-selection level to the selection level after at least one clock of the corresponding clock pulse signal when the corresponding control signal SC is varied from the inactive level to the active level.

Figure 3:
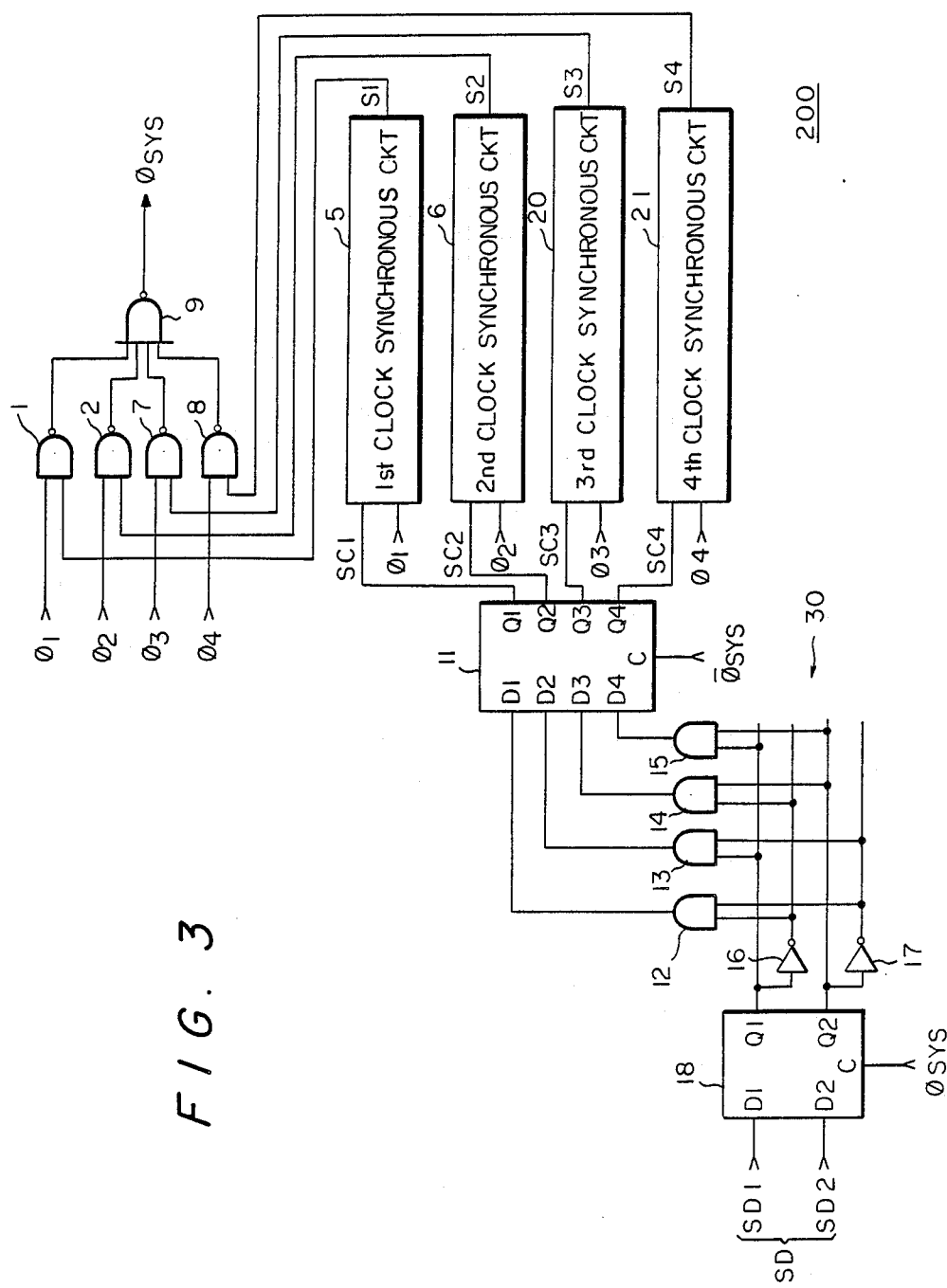
FIG. 3 is a circuit diagram representative of another embodiment of the present invention.

Turning to FIG. 3, a clock selection circuit 200 according to another embodiment of the present invention receives four clock signals $\phi1$ to $\phi4$ and selects and outputs one of them as a system clock signal $\phi_{SYS}$, wherein the same constituents as those shown in FIG. 1 are denoted by the same reference numerals to not repeat further description thereof. Since the circuit 200 selects one of four clock signals $\phi1$ to $\phi4$, the selection data SD consists of two bits SD1 and SD2. The selection data SD is latched by a latch circuit 18 in synchronism with the leading edge of the system clock $\phi_{SYS}$, the outputs Q1 and Q2 thereof are then supplied to a decoder 30 including two inverters 16 and 17 and four AND gates 12 to 15. The decoded outputs from the decoder 30 are latched by a latch circuit 11 in synchronism with the leading edge of the inverted system clock $\overline{\phi_{SYS}}$, i.e. the falling edge of the system clock $\phi_{SYS}$. The Q1 to Q4 outputs of the latch circuit 11 are produced as first to fourth selection control signals SC1 to SC4, respectively. Since the inputs of the AND gates 12 to 15 are connected as shown in FIG. 3 to the true and complementary outputs of the latch circuit 18, one of the control signals SC1 to SC4 takes the active level (high level) with respect to the selection data SD, as shown in the following TABLE.

TABLE

| Selection Data | | Selection Control Signal |
|---|---|---|
| SD1 | SD2 | Taking Active Level |
| 0 | 0 | SC1 |
| 1 | 0 | SC2 |
| 0 | 1 | SC3 |
| 1 | 1 | SC4 |

The selection control signals SC1 to SC4 are then supplied to the first to fourth clock synchronous circuits 5, 6, 20 and 21, respectively, which are provided in accordance with the present invention and each of which has the same construction as the circuit 5 or 6 shown in FIG. 1. The outputs of the clock synchronous circuits 5, 6, 20 and 21 are derived as first to fourth selection signals S1 to S4 and then supplied to NAND gates 1, 2, 7 and 8, respectively. These NAND gates 1, 2, 7 and 8 are further supplied with first to fourth clock pulse signals $\phi1$ to $\phi4$, respectively. The outputs of the NAND gates 1, 2, 7 and 8 are supplied to a four-input NAND gate 9, the output of which is in turn derived as the system clock pulse signal $\phi_{SYS}$.

Figure 4:
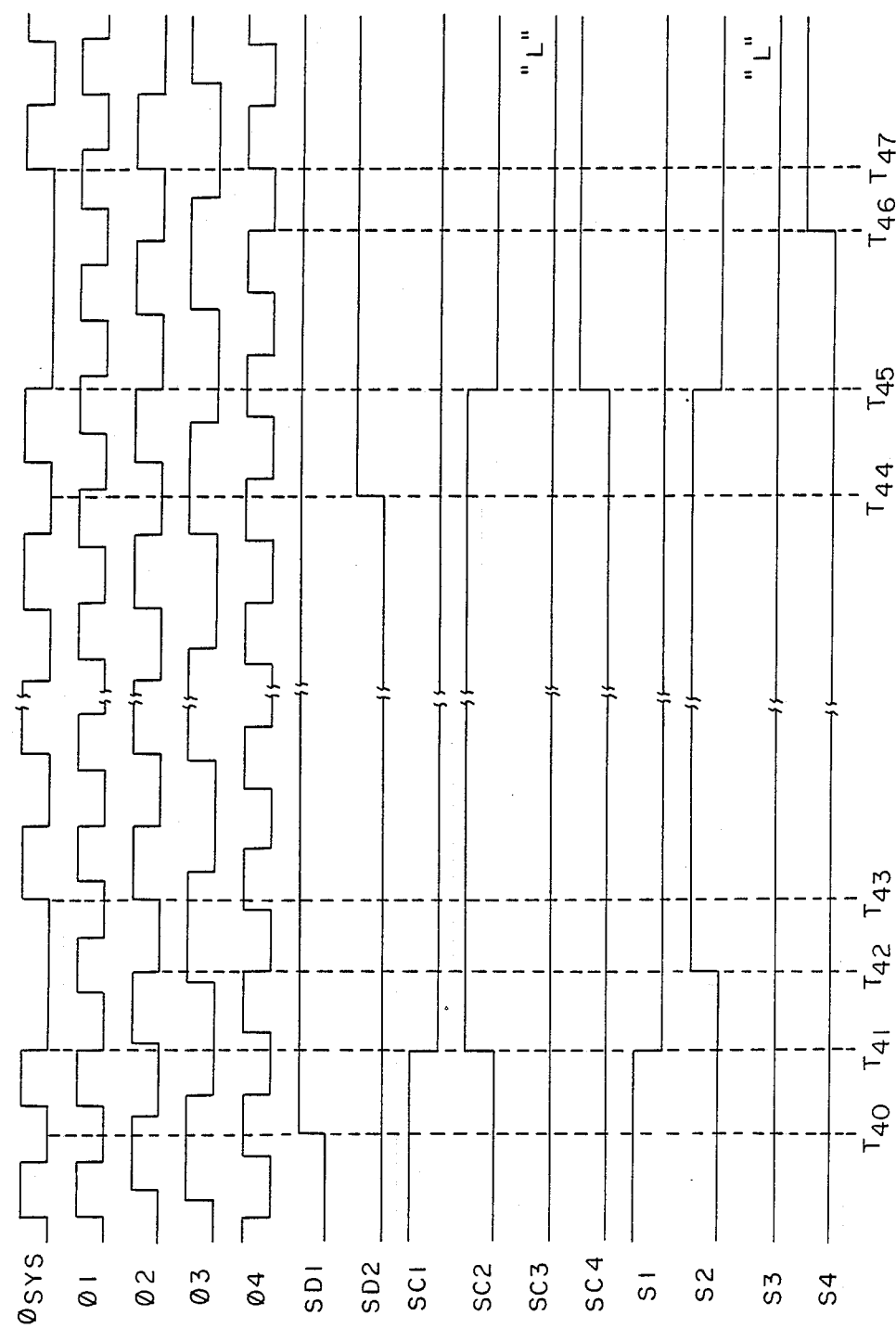
FIG. 4 is a timing chart representative of the circuit shown in FIG. 3.

Assuming that the selection data SD (SD1 and SD2) is "00" and thus the clock selection circuit 200 currently selects the first clock signal $\phi1$, the first control and selection signals SC1 and S1 are at the high level, as shown in FIG. 4. When the selection data is changed to "10" at a time point $T_4$, the control signals SC1 and SC2 are changed to the high level and the low level, respectively, at a time point $T_{41}$ in synchronism with the falling edge of the system clock pulse $\phi_{SYS}$ (i.e., the first clock pulse $\phi1$). In response to the low level of the first control signal SC1, the first selection signal S1 also changes to the low level at the time point $T_{41}$ to close the NAND gate 1. On the other hand, the selection signal S2 changes to the high level at a time point $T_{42}$ in synchronism with the falling edge of second clock $\phi2$. The NAND gate 2 is thereby made open. Thus, the system clock signal $\phi_{SYS}$ changes to the high level at a time point $T_{43}$ and thereafter takes the same cycle period of the second clock signal $\phi2$. When the selection data SD is changed to "11" at a time point $T_{44}$, the second control and selection signals SC2 and S2 are changed to the low level and the fourth control signal SC4 is changed to the high level at a time point $T_{45}$.

Since each of the clock synchronous circuits 5, 6, 20 and 21 transfers the high level of the corresponding control signal SC by use of both of the leading and falling edges of the corresponding clock signal, the fourth selection signal S4 is changed to the high level at a time point 46. As a result, the system clock signal $\phi_{SYS}$ changes to the high level at a time point $T_{47}$ and thereafter takes the same cycle as that of the fourth clock signal $\phi4$.

The present invention is not limited to the above embodiments, but may be changed and modified without departing from the scope and spirit of the invention. For example, the number of the D-FFs 51 and 52 (61 and 62) can be increased. Moreover, the logic gates shown in the drawings can be replaced other gates having the same functions.

What is claimed is:

1. A clock selection circuit comprising:
   selecting means, supplied with a plurality of clock pulse signals and a plurality of selection signals which correspond to said clock pulse signals, for selecting one of said clock pulse signals which corresponds to a selection signal taking a selection level,
   producing means, supplied with selection data, for producing a plurality of control signals, each of which corresponds to one of said selection signals and one of which takes an active level, and
   delaying means, located between said selecting means and said producing means, for delaying said active level in synchronism with a clock impulse signal to be selected.

2. A circuit as claimed in claim 1, wherein said delaying means delays said active level during at least one clock pulse of said clock pulse signal to be selected.

3. A clock selection circuit receiving a plurality of clock pulse signals and selecting one of said clock pulse signals, said clock selection circuit comprising:
   a selection control circuit supplied with selection data and producing a plurality of selection signals, each of said selection signals corresponding to a different one of said clock pulse signals, one of said selection signals, which is designated by a contents of said selection data, taking a selection level and remaining selection signals taking a non-selection level, and
   a selector supplied with said plurality of clock pulse signals and selecting one of said clock pulse signals corresponding to said one selection signal taking said selection level,
   said selection control circuit including
      changing means, responsive to a change in a contents of said selection data, for changing said one selection signal, from said selection level to said non-selection level,
      holding means for holding another selection signal, which is designated by a changed content of said selection data, at said non-selection level until at least one clock pulse of a clock pulse signal corresponding to said selection signal appears after said one selection signal is changed to said non-selection level, and
   changing means for changing said another selection signal to said selection level after said at least one clock pulse of said clock pulse signal appears.

4. A circuit as claimed in claim 3, wherein said holding means includes a delay circuit.

5. A clock selection circuit comprising:

a plurality of gate circuits supplied with a plurality of clock pulse signals, respectively, a selection control circuit supplied with selection data and producing a plurality of selection control signals at a plurality of output nodes thereof, respectively, one of said selection control signals taking a selection level and remaining selection control signals taking a non-selection level in response to said selection data, and a plurality of clock synchronizing circuits, each of which is connected between a corresponding one of said output nodes of said selection control circuit and a corresponding one of said gate circuits and is supplied with a corresponding one of said clock pulse signals, each of said clock synchronizing circuits transferring a change of a corresponding selection control signal from said selection level to said non-selection level to a corresponding gate circuit without a substantial delay and transferring a change of a corresponding selection control signal from said non-selection level to said selection level to a corresponding gate circuit after a delay of at least one clock pulse of a corresponding clock pulse signal.

6. A clock selection circuit for selecting one of a plurality of clock signals, said clock selection circuit comprising:

a plurality of flip-flop circuits, each of which corresponds to one of said clock signals and produces a selection signal which takes a selection level in a set state and a non-selection level in a reset state, a selector, receiving said clock signals and said selection signals from said flip-flop circuits and selecting one of said clock signals corresponding to a flip-flop circuit which produces a selection signal taking said selection level, producing means, responsive to selection data, for producing a plurality of control signals at output nodes thereof, respectively, one of said control signals taking an active level and remaining control signals taking an inactive level, and a plurality of control circuits, each of which is connected between a corresponding one of said output nodes of said producing means and a corresponding one of said flip-flop circuits and is supplied with a corresponding one of said clock signals, each of said control circuits including means, responsive to a change of a corresponding control signal from said active level to said inactive level, for bringing a corresponding flip-flop circuit into said reset state without a substantial delay, and delaying means, responsive to a change of a corresponding control signal from said inactive level to said active level, for delaying said active level of said corresponding control signal in synchronism with a corresponding clock signal to produce a delayed active level.

7. A clock selection circuit as claimed in claim 6, wherein said delaying means comprises a plurality of D-type flip-flop circuits connected in series.

* * * * *